United States Patent

Broyan et al.

[11] Patent Number: 5,324,344
[45] Date of Patent: Jun. 28, 1994

[54] SYSTEM FOR AND METHOD TO VERIFY PROPER OPERATION OF A PARTICULATE EMISSION DETECTOR

[75] Inventors: David Broyan; Robert T. Lewis, both of Macon, Ga.

[73] Assignee: Brown & Williamson Tobacco Corporation, Louisville, Ky.

[21] Appl. No.: 41,004

[22] Filed: Mar. 31, 1993

[51] Int. Cl.⁵ .............................................. B01D 46/02
[52] U.S. Cl. ......................................... 95/25; 55/270; 55/309; 55/312; 55/341.1; 73/28.01; 95/273
[58] Field of Search ............. 210/739, 85, 96.1, 433.1, 210/434, 790; 55/270, 274, 341.1, 341.6, 341.2, 341.3, 341.4, 341.5, 341.7, 309, 312, 314; 95/25, 273; 73/28.01, 31.07

[56] References Cited

U.S. PATENT DOCUMENTS

| | | | |
|---|---|---|---|
| 470,970 | 3/1892 | Bartlett | 55/341.2 |
| 1,454,492 | 5/1923 | Stroud | 55/341.1 |
| 3,772,851 | 11/1973 | Duffy | 73/28.01 |
| 3,865,561 | 2/1975 | Osborn | 55/341.1 |
| 4,377,397 | 3/1983 | Clements | 55/312 |
| 4,523,931 | 6/1985 | Miller et al. | 55/314 |
| 4,999,032 | 3/1991 | Wright | 55/309 |
| 5,209,102 | 5/1993 | Wang et al. | 73/28.01 |

Primary Examiner—Joseph W. Drodge
Attorney, Agent, or Firm—Charles I. Sherman

[57] ABSTRACT

A system and method are provided to verify proper operation of and to adjust a particulate emission detector in a system including a dust collector bag house. A by-pass apparatus is provided around the dust collector bag house which includes a conduit downstream of the inlet to said dust collector bag house and an outlet in fluid communication with a fluid outlet conduit extending from said dust collector bag house.

8 Claims, 1 Drawing Sheet

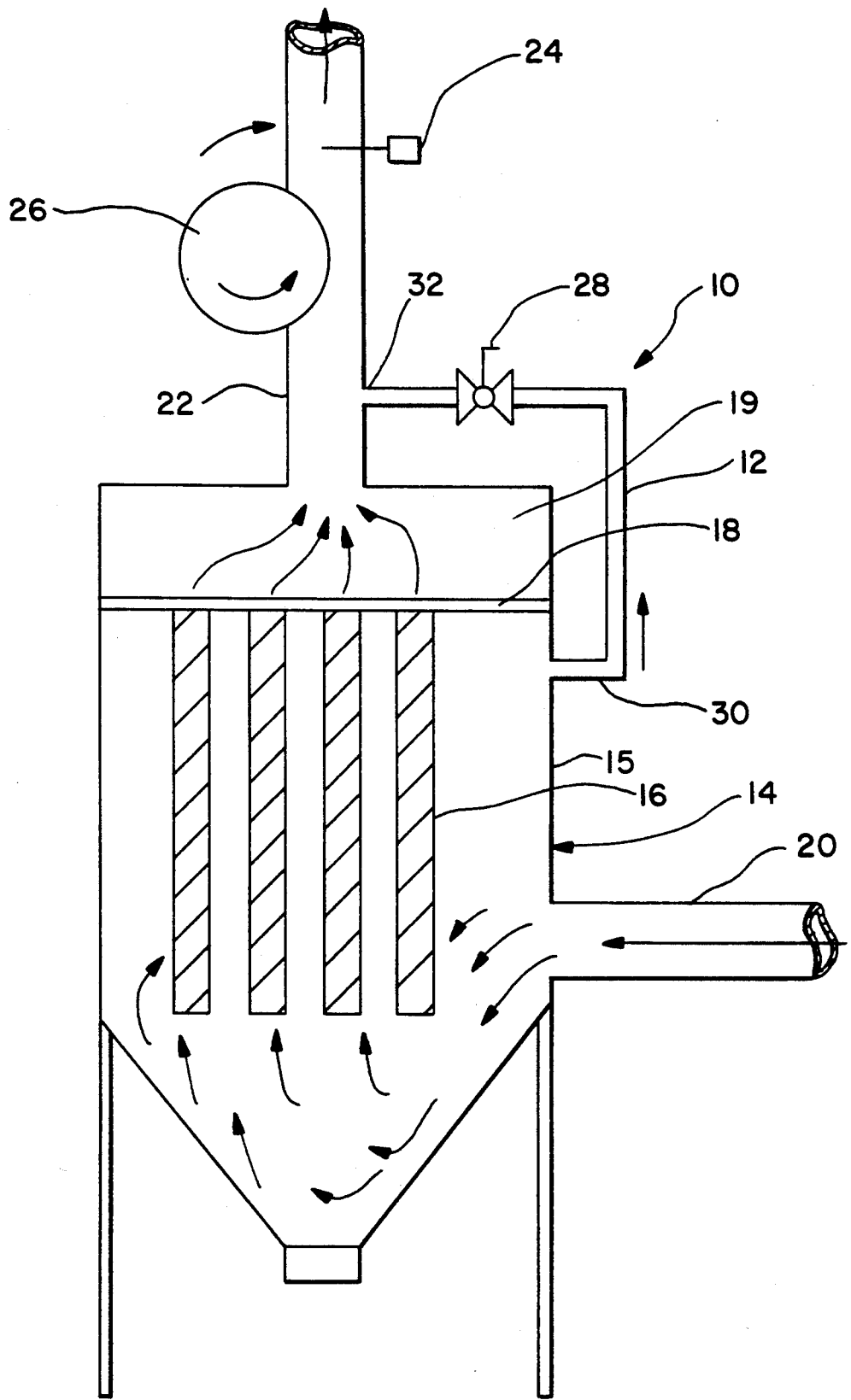
Figure

SYSTEM FOR AND METHOD TO VERIFY PROPER OPERATION OF A PARTICULATE EMISSION DETECTOR

BACKGROUND OF THE INVENTION

This invention relates to particulate emission detectors. Particularly this invention relates to a method to verify the proper operation of a particulate emission detector. Even more particularly, this invention relates to a system verifying proper operation of a particular emission detector for a fluid stream, including particulate materials therein.

In filtration systems, particularly gas filtration systems, emission detectors are utilized therein to determine the concentration of particulate material in the gas stream. Many sensors are available to monitor particulate emissions from filter system, particularly dust collection bag houses wherein the sensors are manually adjusted to alarm upon reaching a user defined threshold value. However, these sensors must be adjusted from time to time to determine whether or not they are accurate in determining the concentration of the particulate matter in the gas stream. And, in most instances the system must be shut down when the particular emission detectors are adjusted or when proper operation thereof is verified.

SUMMARY OF THE INVENTION

It is an object of the present invention to provide a method to verify proper operation of a particulate emission detector.

Another object of the invention is to provide a system to verify a proper operation of a particulate emission detector.

It is a further object of the present invention to provide a by-pass system around a filtration system wherein the downstream portion of the by-pass system is in communication with a particulate emission detector.

It is an even further object of the present invention to provide a system for detection of leaks in a filter bag.

More particularly, the present invention provides a method to verify proper operation of a particulate emission detector comprising the steps of:

passing a fluid stream, including particulate material, into a filtration apparatus;

monitoring the stream of particulate material downstream from the filtration apparatus;

by-passing periodically a portion of said stream of said particulate material around said filtration apparatus;

monitoring said by-passing stream to determine the concentration of particulate materials therein; and, adjusting said particulate emission detector to actuate a signaling device at a preselected amount of particulate material concentration in said fluid stream.

Even more particularly, the present invention provides a system for verifying the operation of an adjustment to a particulate emission detector comprising:

a filtration apparatus;

a fluid inlet to said filtration apparatus;

a fluid outlet from said filtration apparatus;

a by-pass around said filtration apparatus; and, a sensing device in flow communication with said fluid outlet, downstream of said by-pass.

Other features and advantages of the present invention will become more apparent from the following description taken in conjunction with the accompanying drawing which illustrates, by way of example, the principals of the present invention.

BRIEF DESCRIPTION OF THE DRAWING

For a better understanding of the nature and objects of the present invention, reference should be made to the following detailed description and the accompanying drawing, in which:

The FIGURE is a schematic view of one preferred system for verifying operation of and adjustment to a particulate emission detector.

DETAILED DESCRIPTION OF THE PREFERRED EMBODIMENT

The FIGURE shows a filtration system 10, including a by-pass 12 around a filter apparatus which is shown as a filter bag house 14 and includes a housing 15 and a plurality of filter bags 16 therein. The filter bags 16 are vertically supported from an outlet manifold 18 which includes a plurality of flow-through orifices therein into a discharge chamber 19. Downstream from and in flow communication with the discharge chamber 19 is an outlet conduit 22. The outlet conduit 22 includes an exhaust fan 26 therein for moving the gas stream in and through the filter bag house 14 and a particulate emission detector 24 which is located downstream from the exhaust fan. One preferred particulate emission detector 24 is a TRIBOFLOW detector manufactured by Auburn International. Inc.

The filter by-pass includes an inlet conduit 30 which is in flow communication with the unfiltered flow stream in the bag house 14. By-pass 12 further includes a valve 28, which is preferably a normally closed spring return ball valve, and an outlet conduit 32. The outlet conduit 32 at its downstream end is in flow communication with the outlet conduit 22 from the bag house 14.

In operation, fluid stream including particulate materials therein enters the bag house 14 through the inlet conduit 20 and passes up through the vertically extending tubular filter bags 16. The filter bags 16, if operating properly, remove a substantial portion of the particulate material and a relatively clean fluid stream exits the bag house through the outlet conduit 22. If, however, one of the filter bags 16 has a leak therein, then the concentration of particulate materials will increase in the flow stream leaving the bag house 14 through the outlet conduit 22. As the particulate emission detector 24 is generally set at a preselected concentration of particulate materials below that which would be anticipated by a leak in the tubular filter bags, then a signal device, such as an alarm, a light, or the like, is activated thereby advising an operator that there is an increased concentration of particulate materials in the flow stream leaving the filter bag house.

In order to verify the proper operation of the particulate emission detector 24, the valve 28 is opened and the flow stream is by-passed around the filter bags 16 directly into the outlet conduit 22 so that a reading or determination can then be taken on the particulate emission detector 24. This concentration determination can then be compared with the concentration of the particulate materials in outlet conduit 22 with valve 28 closed. If the particulate emission detector 24 does not determine a higher concentration of particulate material in outlet conduit 22 with valve 28 open, then a proper adjustment of the detecting device can be made.

Although the invention has been described in detail with reference to a specific preferred embodiment, various modifications exist within the scope and spirit of the present invention and it is not intended that the aforementioned discussion in any way limits the scope of the present invention as set forth in the following claims appended hereto.

What is claimed is:

1. A system for verifying operation of and adjustments to a particulate emission detector comprising:
   a dust collector bag house;
   a fluid inlet to said dust collector bag house;
   a fluid outlet conduit extending from said dust collector bag house;
   a by-pass around filter means within said dust collector bag house, said by-pass including a conduit having an inlet downstream of the inlet to said dust collector bag house and an outlet connecting with said fluid outlet conduit: and
   a particulate emission detector in flow communication with said fluid outlet conduit and said by-pass.

2. The system of claim 1 wherein said by-pass includes a normally closed valve therein.

3. A method to verify proper operation of a particulate emission detector comprising the steps of:
   passing a fluid stream including a particulate material into a dust collector bag house;
   monitoring the stream downstream from the dust collector bag house;
   by-passing periodically a portion of said stream of particulate material around filter means within said dust collector bag house, said by-passing including providing a conduit having an inlet downstream of the inlet to said dust collector bag house and an outlet connecting with a fluid outlet conduit extending from said dust collector bag house; and
   monitoring said stream while bypassing said portion.

4. The method of claim 3 including the step of adjusting said particulate emission detector to a preselected amount of particulate material concentration.

5. The method of claim 4 wherein said particulate emission detector includes a signal device, said signal device being set to respond to a said preselected amount of particulate material concentration in said gas stream.

6. The method of claim 5 wherein said signal device is an alarm.

7. The method of claim 5 wherein said signal device is a light.

8. In a dust collector bag house including at least one dust collector filter bag therein, a fluid inlet and, a fluid outlet conduit extending from said bag house, the improvement comprising:
   a filter bag leakage detecting system comprising a fluid by-pass around said at least one dust collector filter bag and a particulate emission detector in flow communication with said fluid outlet conduit and said by-pass, said by-pass including a conduit having an inlet downstream of the inlet to said dust collector bag house and an outlet connecting with said fluid outlet conduit.

* * * * *